(12) United States Patent  
Harbu et al.

(10) Patent No.: US 7,000,744 B2
(45) Date of Patent: Feb. 21, 2006

(54) SHOCK ABSORBER CYLINDER HEAD SCRAPER

(75) Inventors: Julian Harbu, Toronto (CA); Simon Van Wonderen, Toronto (CA)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/417,531

(22) Filed: Apr. 17, 2003

(65) Prior Publication Data

US 2004/0206590 A1  Oct. 21, 2004

(51) Int. Cl.
*F16F 9/36* (2006.01)
(52) U.S. Cl. .................. 188/322.17; 277/550; 277/568
(58) Field of Classification Search ........... 188/322.16, 188/322.17, 322.19; 277/564, 568, 585, 277/550, 910
See application file for complete search history.

(56) References Cited

U.S. PATENT DOCUMENTS

| | | | |
|---|---|---|---|
| 4,013,299 A * | 3/1977 | Scott .......................... 277/556 |
| 4,987,826 A | 1/1991 | Deppert et al. |
| 5,098,071 A * | 3/1992 | Umetsu .................... 267/64.27 |
| 5,178,243 A | 1/1993 | Hamada et al. |
| 5,441,132 A * | 8/1995 | Pradel et al. ............... 188/315 |
| 5,584,368 A | 12/1996 | Larsson |
| 5,653,449 A * | 8/1997 | Martin ....................... 277/500 |
| 6,318,526 B1 | 11/2001 | Kruckemeyer et al. |
| 6,640,943 B1 * | 11/2003 | Daws et al. ........... 188/322.17 |

* cited by examiner

Primary Examiner—Pam Rodriguez
(74) Attorney, Agent, or Firm—Carlson, Gaskey & Olds

(57) ABSTRACT

A vehicle shock absorber is provided that includes a piston rod. A cylinder head having a bore defining an axis supports the rod within the bore. A scraper is arranged proximate to the cylinder head and includes a hole with the rod arranged within the hole. The scraper removes debris from a portion of the rod exterior of the scraper opposite the cylinder head. Preferably, the scraper is axially located and retained relative to the cylinder head by a retainer. A wiper is at least partially disposed in the hole of the scraper and is in engagement with the rod. The wiper removes water from the rod preventing penetration of the water past the wiper.

7 Claims, 1 Drawing Sheet

SHOCK ABSORBER CYLINDER HEAD SCRAPER

BACKGROUND OF THE INVENTION

This invention relates to a vehicle shock absorber, and more particularly, the invention relates to an apparatus for removing ice and debris from a shock absorber rod.

Vehicle shock absorbers such as those used in snowmobile and other cold weather applications may have problems of icing inhibiting proper operation of the shock absorber. Snow and ice become compacted around the shock absorber rod preventing the rod from moving in and out of the cylinder. Prior art devices have proposed a scraper to scrape the ice and other debris from the rod. However, these prior art devices utilize separate support rings and other components to support the scraper, which increases the dead length of the absorber and adds cost to the assembly. Furthermore, the scrapers are made from a plastic material. Plastic scrapers have limited durability in deicing applications.

The shock absorber rod is exposed to water during its operation including during deicing with the scraper. Prior art scrapers have failed to provide any mechanisms for preventing water from penetrating the rod and the scraper interface. Instead, they relying only on the rod seal, which is best suited to retaining hydraulic fluid within the cylinder. Water may enter the shock absorber fluid chamber through the interface and cause damage to the shock absorber. Therefore, what is needed is an improved scraper for a shock absorber.

SUMMARY OF THE INVENTION AND ADVANTAGES

The present invention provides a vehicle shock absorber including a piston rod. A cylinder head having a bore defining an axis supports the rod within the bore. A scraper is arranged proximate to the cylinder head and includes a hole with the rod arranged within the hole. The scraper removes debris from a portion of the rod exterior of the scraper, and opposite the cylinder head. Preferably, the scraper is axially located and retained relative to the cylinder head by a retainer. A wiper is at least partially disposed in the hole of the scraper and is in engagement with the rod. The wiper removes water from the rod preventing penetration of the water past the wiper.

Accordingly, the above invention provides an improved scraper for a shock absorber.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
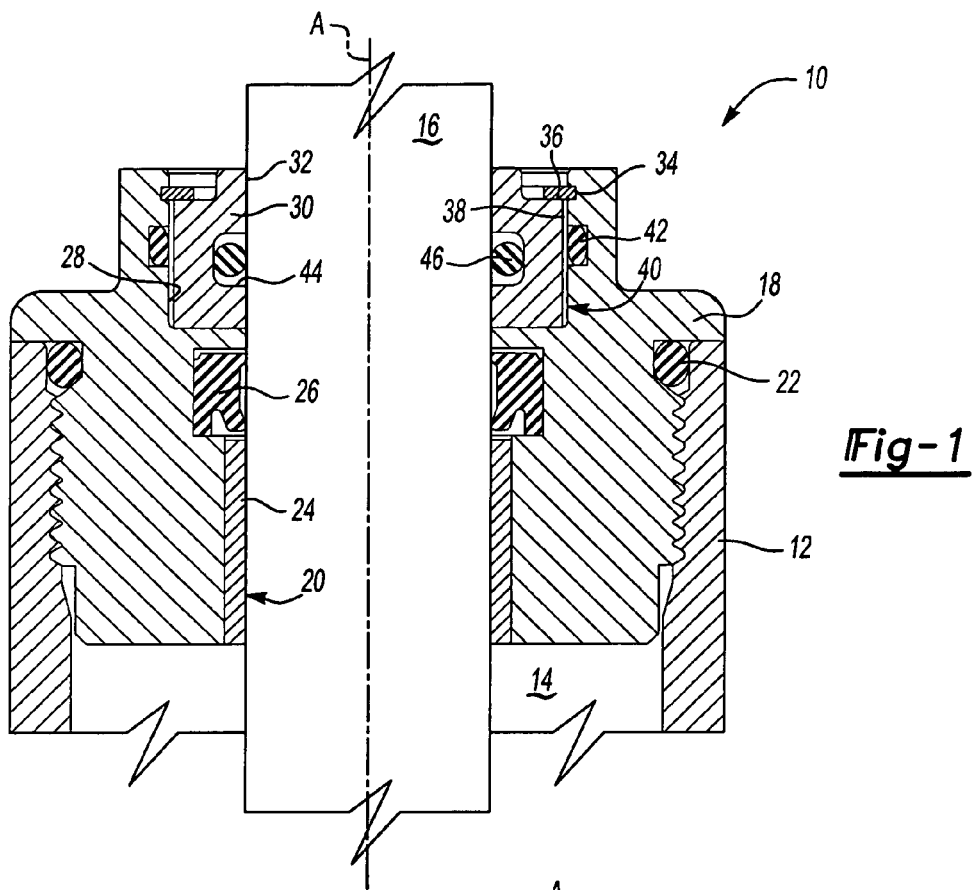
FIG. 1 is a cross-sectional view of the present invention scraper and wiper arrangement.
Figure 2:
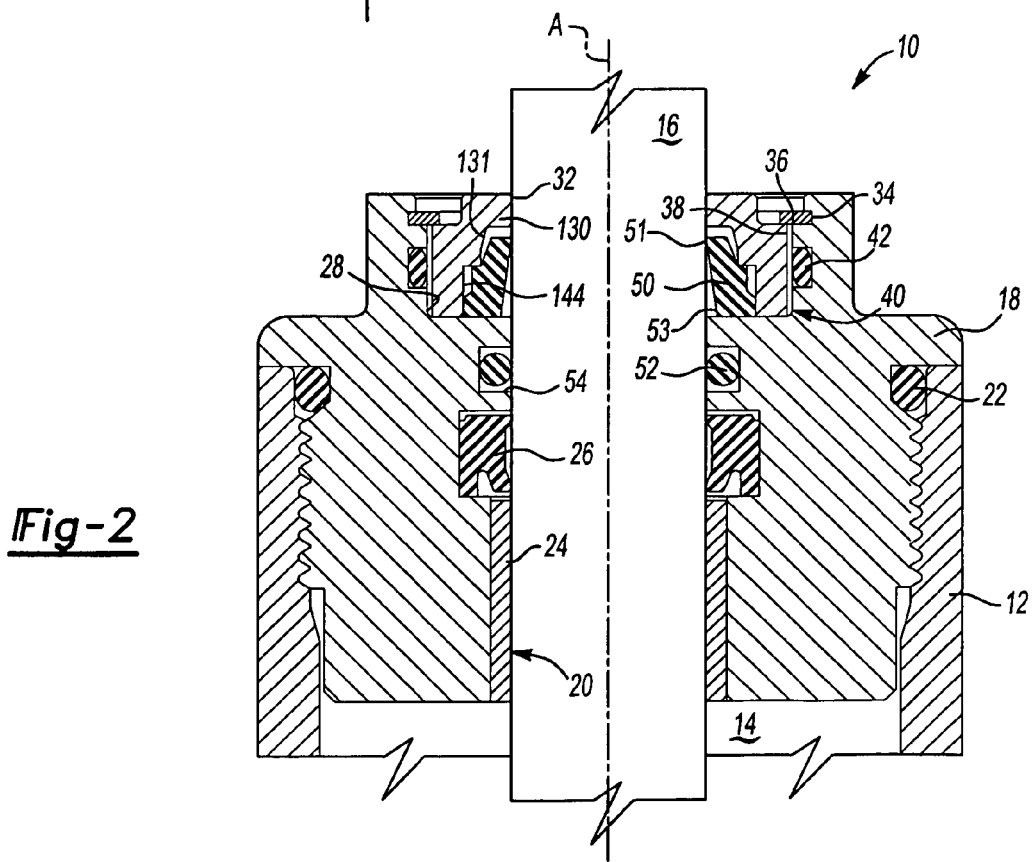
FIG. 2 is another arrangement of the present invention scraper and wiper.

A shock absorber 10 is shown in FIGS. 1 and 2. The shock absorber 10 includes a housing 12 defining a fluid chamber 14. A rod 16 is disposed within the housing 12 and includes a piston (not shown) secured to an end of the rod 16 within the fluid chamber 14, as is well known in the art. The rod 16 moves along the axis A in response to an input from the vehicle. A cylinder head 18 is secured to the housing 12 at one end. The cylinder head 18 includes a bore 20 with the rod 16 slidably disposed within the bore 20, preferably by a bushing 24. A seal 22 such as an O-ring is arranged between the cylinder head 18 and the housing 12 to retain hydraulic fluid within the fluid chamber 14. The piston provides damping as it moves through the hydraulic fluid in the fluid chamber 14. A rod seal 26 is supported by the cylinder head 18 to retain the hydraulic fluid within the housing 12 as the piston moves through the fluid chamber 14.

The cylinder head 18 includes an annular pocket 28. The present invention scraper 30 is arranged with the annular pocket 28 and includes a hole 32 with the rod 16 disposed within the hole 32. The annular pocket 28 is adjacent to the bore 20 and may include an annular groove 34 in an outer portion with a retaining clip 36 for axially retaining the scraper 30 within the annular pocket 28. The scraper 30 includes an outer circumference 38 spaced from the outer portion of the annular pocket 28 to create a gap 40. The gap 40 ensures that the scraper does not bind in the cylinder head 18 if the hole 32 and bore 20 are not concentric due to machining tolerances. A seal 42 such as an O-ring is arranged in the gap between the cylinder head 18 and the scraper 30 to prevent the intrusion of water and debris past the scraper. The scraper 30 is preferably constructed from a bronze material to enhance the durability of the scraper. The scraper 30 removes debris from the rod 16 as it moves axially.

Referring to FIG. 1, the scraper 30 includes an annular recess 44 that receives a wiper 46 such as the O-ring depicted. The wiper 46 seals between the scraper 30 and the rod 16 to ensure that water does not penetrate the wiper 46.

Referring to FIG. 2, an alternate seal having a tapered inner surface 50 may be arranged within the annular opening 144 in scraper 130 to remove the water from the rod 16 as it moves along the axis A. As can he seen in FIG. 2, the annular opening 144 begins adjacent an outer point in the scraper 130 defined by ledge 131 extending all the way to an opposed end of the scraper 130. That is, the opening 144 extends all the way to an inwardly spaced end of the scraper 130. A secondary seal 52 such as an O-ring may be arranged within an annular recess 54 in the cylinder head 18 to further ensure that water does not penetrate the cylinder head 18 and make its way into the chamber 14. Notably, the seal 50 has an outer point 51 that contacts the shock absorber rod 16, and an inward end 53 that is spaced away from the rod 16.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle shock absorber comprising:
   a piston rod;
   a cylinder head having a bore with said piston rod in sliding engagement within said bore;
   a scraper proximate to said cylinder head and including a hole with said piston rod extending through said hole, said scraper removing debris from a portion of said piston rod as said piston rod moves within said hole, said scraper having a first diameter at said hole, and an opening of a second diameter spaced away from an outer portion of said scraper, said second diameter being larger than said first diameter, a ledge defining said hole at an outer edge of said scraper, and said opening extending from said ledge, to provide an open end at an inner edge of said scraper; and a primary seal received within said opening, said primary seal being in sealing contact with an outer peripheral surface of said piston rod, said primary seal extending to said inner edge of said scraper and to said open end, said primary seal is further in sealing contact with a surface on said cylinder head.

2. The shock absorber as set forth in claim 1, wherein a rod seal is supported in said cylinder head in engagement with said piston rod for retaining hydraulic fluid within the shock absorber.

3. The shock absorber as set forth in claim 2, wherein a bushing is located proximate to said rod seal on a side opposite said scraper.

4. The shock absorber as set forth in claim 1, wherein said scraper is constructed from a bronze material.

5. The shock absorber as set forth in claim 1, wherein a retainer clip retains said scraper within said cylinder head, and prevents said scraper from moving outwardly of said cylinder head.

6. The shock absorber as set forth in claim 1, wherein said primary seal being angled such that an outer end of said primary seal is in contact with said outer peripheral surface of said piston rod, and an inner end of said primary seal being spaced from said piston rod.

7. A vehicle shock absorber comprising:

a piston rod;

a cylinder head having a bore with said piston rod in sliding engagement within said bore;

a scraper proximate to said cylinder bead and including a hole with said piston rod extending through said hole, said scraper removing debris from a portion of said piston rod as said piston rod moves within said hole, said scraper having a first diameter at said hole, and an opening of a second diameter extending away from an outer portion of said scraper, said second diameter being larger than said first diameter, a ledge defining said hole at an outer edge of said scraper, and said opening extending inwardly from said ledge, to provide an open end at an inner edge of said scraper;

said opening having a diameter greater than said first diameter from said ledge to said inner edge of said scraper such that a primary seal can be moved into said opening from said open end of said scraper; and said primary seal received within said opening, said primary seal being in sealing contact with an outer peripheral surface of said piston rod, said primary seal further being in sealing contact with a surface on said cylinder head.

\* \* \* \* \*

UNITED STATES PATENT AND TRADEMARK OFFICE
CERTIFICATE OF CORRECTION

| | | |
|---|---|---|
| PATENT NO. | : 7,000,744 B2 | Page 1 of 1 |
| APPLICATION NO. | : 10/417531 | |
| DATED | : February 21, 2006 | |
| INVENTOR(S) | : Harbu et al. | |

It is certified that error appears in the above-identified patent and that said Letters Patent is hereby corrected as shown below:

Column 4,
Line 8, "bead" should read as -- head --.

Signed and Sealed this

Twentieth Day of June, 2006

JON W. DUDAS
*Director of the United States Patent and Trademark Office*